US010596981B2

(12) United States Patent
Granholm (10) Patent No.: US 10,596,981 B2
(45) Date of Patent: Mar. 24, 2020

(54) BRACKET FOR FIXATING A HOUSING COMPRISING A CAMERA (71) Applicant: Volvo Car Corporation, Göteborg (SE)

(72) Inventor: Johan Granholm, Varberg (SE)

(73) Assignee: Volvo Car Corporation, Göteborg (SE)

(*) Notice: Subject to any disclaimer, the term of this patent is extended or adjusted under 35 U.S.C. 154(b) by 0 days.

(21) Appl. No.: 16/386,429

(22) Filed: Apr. 17, 2019

(65) Prior Publication Data
US 2019/0344726 A1 Nov. 14, 2019

(30) Foreign Application Priority Data
May 8, 2018 (EP) .................................... 18171184

(51) Int. Cl.
B60R 11/04 (2006.01)
H04N 5/225 (2006.01)
B60R 11/00 (2006.01)

(52) U.S. Cl.
CPC .......... B60R 11/04 (2013.01); H04N 5/2252 (2013.01); *B60R 2011/0026* (2013.01)

(58) Field of Classification Search
CPC ............ B60K 35/00; B60K 2370/1438; B60K 2370/152; B60K 2370/146; B60K 2370/173; B60K 37/06; B60K 2370/126; B60K 2370/135; B60K 2370/143
See application file for complete search history.

(56) References Cited

U.S. PATENT DOCUMENTS

| 7,654,425 | B2 * | 2/2010 | Huang | B60R 11/04 224/483 |
| 2002/0080016 | A1 * | 6/2002 | Keirstead | B60R 1/00 340/436 |
| 2010/0245660 | A1 * | 9/2010 | Saitoh | H04N 5/2252 348/373 |

FOREIGN PATENT DOCUMENTS

| EP | 3103684 A1 | 12/2016 |
| EP | 3173290 A1 | 5/2017 |

OTHER PUBLICATIONS

Aug. 22, 2018 European Search Report issue on International Application No. EP18171184.

* cited by examiner

*Primary Examiner* — Dave Czekaj
*Assistant Examiner* — Kehinde Abimbola
(74) *Attorney, Agent, or Firm* — Clements Bernard Walker; Christopher L. Bernard (57) ABSTRACT A bracket for fixating a housing including a camera to a windscreen of a road vehicle including a base plate and a fixation arrangement. The fixation arrangement includes a cradle for receiving a locking pin protruding from the housing and a spring for applying a pressure on the locking pin forcing the locking pin towards a seat of the cradle when the spring is inserted into at least one slot of the cradle such that the locking pin is inserted located between the spring and the cradle. The spring is an elongated flat plate and includes a through-hole for securing the spring to the base plate. The through-hole is arranged at a longitudinally distal end of the spring and the fixation arrangement includes a first protrusion connected to said base plate. The first protrusion is arranged to engage the through-hole when the spring is inserted into the slot.

13 Claims, 6 Drawing Sheets

Fig. 6

BRACKET FOR FIXATING A HOUSING COMPRISING A CAMERA

CROSS-REFERENCE TO RELATED APPLICATION

The present disclosure claims the benefit of priority of co-pending European Patent Application No. 18171184.7, filed on May 8, 2018, and entitled "Bracket for Fixating a Housing Comprising a Camera," the contents of which are incorporated in full by reference herein for all purposes.

TECHNICAL FIELD

The present application relates to a bracket for fixating a housing including a camera to a windscreen of a vehicle.

BACKGROUND

Modern road vehicles, such as e.g. cars, lorries, buses or trucks, are commonly equipped with a plurality of sensors and cameras for monitoring the surroundings of the road vehicle. Such sensors and cameras are usually mounted to a windscreen of the road vehicle in order to provide a protected yet undisturbed field of vision for the sensors and cameras mounted to the windscreen. In order to properly mount the cameras and sensors, brackets including fixation arrangements are commonly used. These brackets are usually preassembled and delivered to an assembly line where the camera and or sensor is mounted on the bracket.

US 2017/0240120 A1 discloses a carrier device for attachment to a pane of a motor vehicle. The carrier device includes a base plate which can be secured to the pane. A carrier arrangement of the carrier device is formed to hold a housing including at least one camera. The carrier arrangement includes a holding element and a spring element disposed in the holding element, which spring element includes an angled leg and a loss prevention device in the form of a tab formed in the manner of an undercut. The tab may serve as a securing element which ensures that the spring remains in an insertion region of the holding element. The assembly of the known carrier device may require a high degree of effort in order to correctly mount the springs to the holding element for ensuring a correct mounting of the camera. Furthermore, a high number of manufacturing steps are required for producing each of the springs, which therefore is both time and cost consuming.

SUMMARY

Embodiments herein therefore aim to provide an improved bracket for fixating a housing including a camera which is easy and cost efficient to manufacture.

This is achieved by means of a bracket for fixating a housing including a camera, wherein the bracket is configured to be mounted to a windscreen of a road vehicle. The bracket includes a base plate adapted to be mounted to the windscreen and a fixation arrangement for securing the housing including the camera to the bracket. The fixation arrangement includes a cradle for receiving a locking pin protruding from the housing and a spring for applying a pressure on the locking pin forcing the locking pin towards a seat of the cradle when the spring has been inserted into at least one slot of the cradle such that the locking pin is located between the spring and the cradle. The spring has a shape of an elongated flat plate and includes a through-hole for securing the spring to the base plate. The through-hole is arranged at a longitudinally distal end of the spring. The fixation arrangement includes a first protrusion connected to the base plate, wherein the protrusion is arranged to engage the through-hole when the spring is inserted into the slot of the cradle.

The provision that the protruding element is connected to the base plate and that the spring has the shape of an elongated flat plate and includes a through-hole at a longitudinally distal end of the spring has the benefit that no reshaping of the spring is required in order to provide a fixation of the spring to the bracket. The production time of the spring can thereby be reduced since the absence of any bends or angles in the material of the spring has the benefit that the material of the spring does not require any after-treatment, such as e.g. heat treatment of the material. Thereby the production time and cost of the spring may be reduced. Optionally, said first protrusion is a part of said cradle. This provision has the benefit that the first protrusion can be manufactured together with the cradle which allows a compact arrangement of the cradle and the first protrusion.

Optionally, the spring may be made of metal. This provision has the benefit that the spring is durable and reduces the risk of the spring breaking upon assembly or de-assembly of the bracket.

Optionally, the spring may be symmetric in two perpendicular planes extending through a center of the spring. This provision has the benefit that the spring is not direction sensitive and thus cannot be inserted into the slot of the cradle in a wrong direction which may prevent the mounting of the housing including the camera to the bracket and would require de-assembly and re-assembly of the fixation arrangement. Hence, the cost and assembly time of the bracket can be reduced.

Optionally, the spring may include a through-hole at each longitudinally distal end of the spring. This has the benefit that the spring may be symmetric in three perpendicular planes which further minimizes the risk that the spring is wrongfully inserted into the slot of the cradle.

Optionally, the first protrusion may be angled in an insertion direction of the spring, thereby allowing the spring to slide over the protrusion when the spring is inserted into the slot of the cradle, such that the first protrusion engages the through-hole and prevents a movement of the spring in a direction opposite to the insertion direction. This provision has the benefit that the spring is secured to the cradle, such that when the pin is inserted into the cradle, the spring will not slide out of the slot.

Optionally, the fixation arrangement further includes a second protrusion arranged at a distance from the first protrusion such that a groove for accepting the spring, when the spring is fully inserted into the slot, is created, thereby restricting a movement of the spring in the insertion direction and in a direction opposite of the insertion direction. This provision has the benefit that the spring is secured in both directions along a longitudinal axis of the spring.

Optionally, the cradle includes a third protrusion arranged to contact the spring when the spring is inserted into the slot of the cradle, such that the second protrusion preloads the spring. This provision has the benefit that the spring is prevented from moving and rattling around when the bracket is transported from a place of assembly of the bracket to a place where the housing including the camera is mounted to the bracket. By reducing the movement of the spring during transport, the risk of the spring becoming loose and getting lost during transport is also reduced.

Optionally, the fixation arrangement includes an opening for allowing the locking pin to be inserted into the fixation arrangement in between the cradle and the spring. This provision allows the rod shaped pin of the housing including the camera to be easily slid into the fixation arrangement, thereby facilitating the mounting of the housing to the bracket.

Optionally, a surface of the slots, which surface is located the farthest away from the seat of the cradle, is arranged at an angle to a common geometrical axis of the slots, such that the slots are wider towards the receiving portion of the cradle than towards an outside of the cradle. Thereby, the resilient length of the spring may be increased when the spring is in its loaded state, such as e.g. when the locking pin is inserted between the spring and the bottom of the cradle.

Optionally, the bracket includes a plurality of fixation arrangements. The plurality of fixation arrangements ensures a proper fixation of the housing to the bracket and prevents the housing from being displaced, thereby reducing the risk of the view of the camera being disturbed.

Optionally, the bracket includes three fixation arrangements, wherein a first fixation arrangement is arranged in front of a mounting area for mounting the housing including the camera when the bracket is mounted to the windscreen of the road vehicle, and wherein a second and a third fixation arrangement are arranged on respective sides of the mounting area, which sides are substantially parallel to a longitudinal axis of the road vehicle, wherein the fixation arrangements are open in the same direction. This provision allows the housing including the camera to be slid into the mounting area between the second and the third fixation arrangements and the locking pins to be simultaneously inserted into a respective fixation arrangement when the housing has reached its mounting position. Thereby the housing including the camera can be easily snapped into place on the bracket. This provides the benefit of an easy and quick assembly of the bracket and housing including the camera. The provision of three fixation arrangements further provides a well-defined positioning of the camera on the bracket.

Also disclosed is an assembly including the bracket and a housing including a camera. The housing includes one or more locking pins and wherein each locking pin of the housing is fixated in a corresponding fixation arrangement of the bracket.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DESCRIPTION OF EMBODIMENTS

Figure 1:
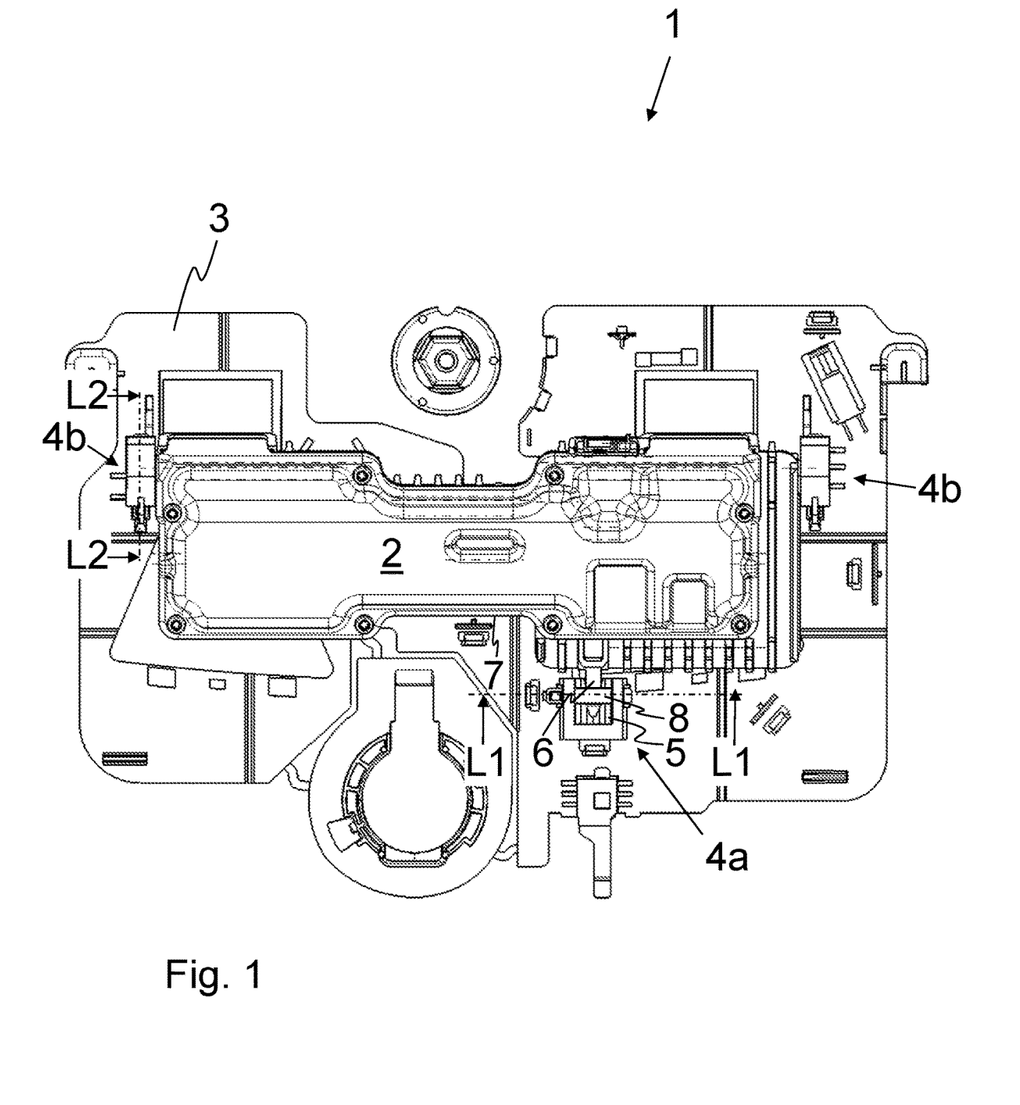
FIG. 1 is a schematic illustration of a bracket for fixating a housing including a camera according to embodiments herein.

FIG. 1 shows a plan view of a bracket 1 for fixating a housing 2 including a camera according to embodiments herein. The bracket 1 is configured to be mounted to the inside of a windscreen of a road vehicle. The bracket 1 includes a base plate 3 adapted to be mounted to the windscreen, e.g. by means of an adhesive. The bracket 1 further includes one or more fixation arrangements 4 for securing the housing 2 including the camera to the bracket 1. The housing 2 including the camera may include one or more pins protruding from one or more side walls 7 of the housing 2. Purely by way of example and applicable for all embodiments herein, the locking pins 6 may be rod-shaped. The fixation arrangement 4 includes a cradle 5 for receiving the locking pin 6 and a spring 8 for applying a pressure on the locking pin 6. The pressure from the spring forces the locking pin 6 towards a seat of the cradle 5 when the locking pin 6 is at least partially located between the spring 8 and the cradle 5. The cradle 5 is open to at least one side for allowing the rod shaped pin 6 to be inserted into the cradle 5.

The number of fixation arrangements 4 is dependent on the number of pins 6 arranged on the housing 2 including the camera. Hence, when the housing 2 includes a plurality of locking pins 6, the bracket 1 may include a plurality of fixation arrangements 4. In order to provide a secure and reproducible positioning of the camera on the bracket, the housing 2 may include three locking pins 6 arranged on respective side walls 7 of the housing 2 as shown in the exemplary embodiment in FIG. 1. Hence, the bracket also includes three fixation arrangements 4a-b. A first fixation arrangement 4a may be arranged in front of a mounting area for mounting the housing 2 including the camera when the bracket is mounted to the windscreen of the road vehicle. It shall however be noted that the first fixation arrangement may also be mounted behind the mounting area. In front of the mounting area shall herein be interpreted as being between the mounting area and a front of the road vehicle, whereas behind the mounting area shall be interpreted as being between the mounting area and a rear of the road vehicle. A second and a third fixation arrangement 4b may be arranged on respective sides of the mounting area, which sides are substantially parallel to a longitudinal axis of the road vehicle.

Figure 2:
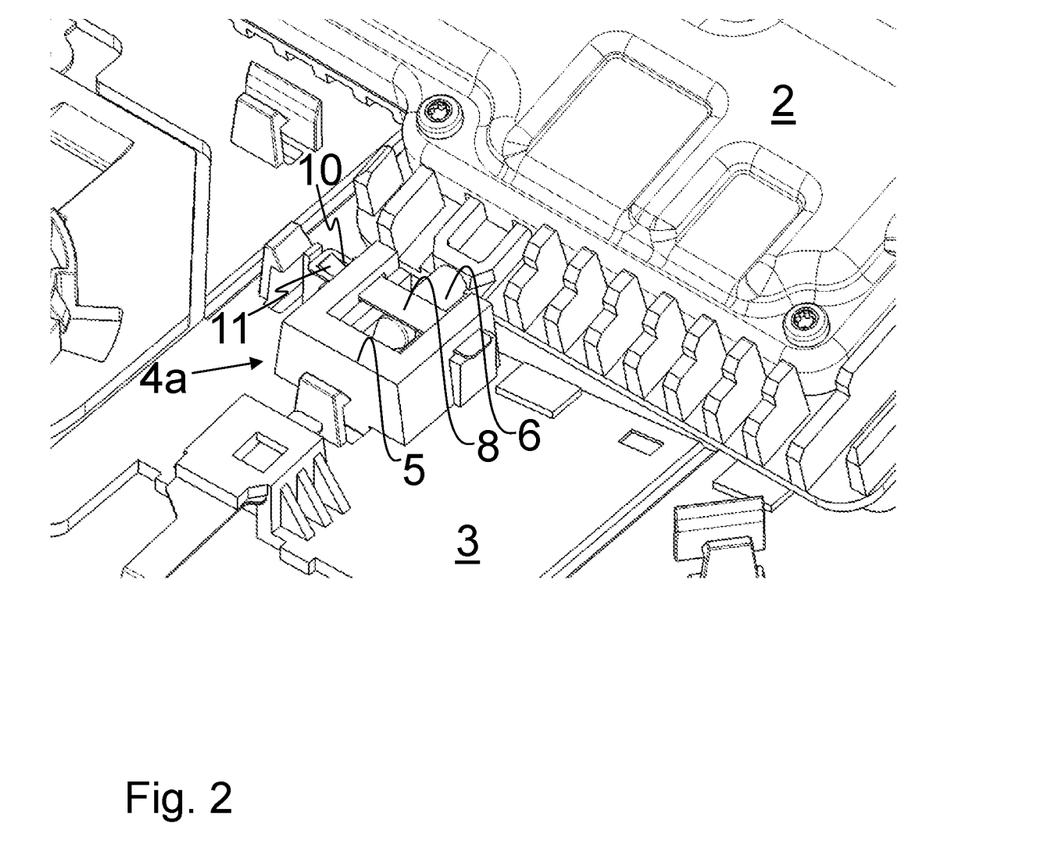
FIG. 2 is a schematic illustration in more detail of a fixation arrangement on the bracket of FIG. 1 according to a first embodiment herein.

FIG. 2 shows a perspective view of the first fixation element 4a according to embodiments herein. The fixation element 4a includes the cradle 5 and the spring 8. The cradle 5 includes a plurality of side walls extending from the base plate 3, which side walls create a receiving portion for receiving the locking pin 6 of the housing 2. The cradle 5 includes a slot 12 for receiving the spring 6. In the embodiment shown in FIG. 2, two opposite side walls of the cradle each include a slot 12. The spring 8 may be inserted through the slots 12 in the two opposing side walls such that it spans the compartment for receiving the locking pin 6, see FIG. 3. The fixation arrangement 4a includes a protrusion 11 connected to the base plate 3. For instance, and as exemplified in FIG. 2, the protrusion 11 may extend from the cradle 5. The protrusion 11 is arranged to engage a through-hole 10 of the spring 8 when the spring 8 is inserted into the slot 12 of the cradle 5 for securing the spring 8 to the cradle 5. The cradle 5 is open to at least one side, thereby creating an opening for allowing the pin 6 to be inserted into the fixation element 4a. The pin 6 may e.g. be inserted into the fixation element 4a by sliding the pin 6 in between the spring 8 and the cradle 5 from the open side of the cradle 5. However, the pin 6 may also be inserted into the cradle 5 prior to inserting the spring 8 into the slots 12. The first fixation element 4a will be described in further detail with reference to FIG. 3.

Figure 3:
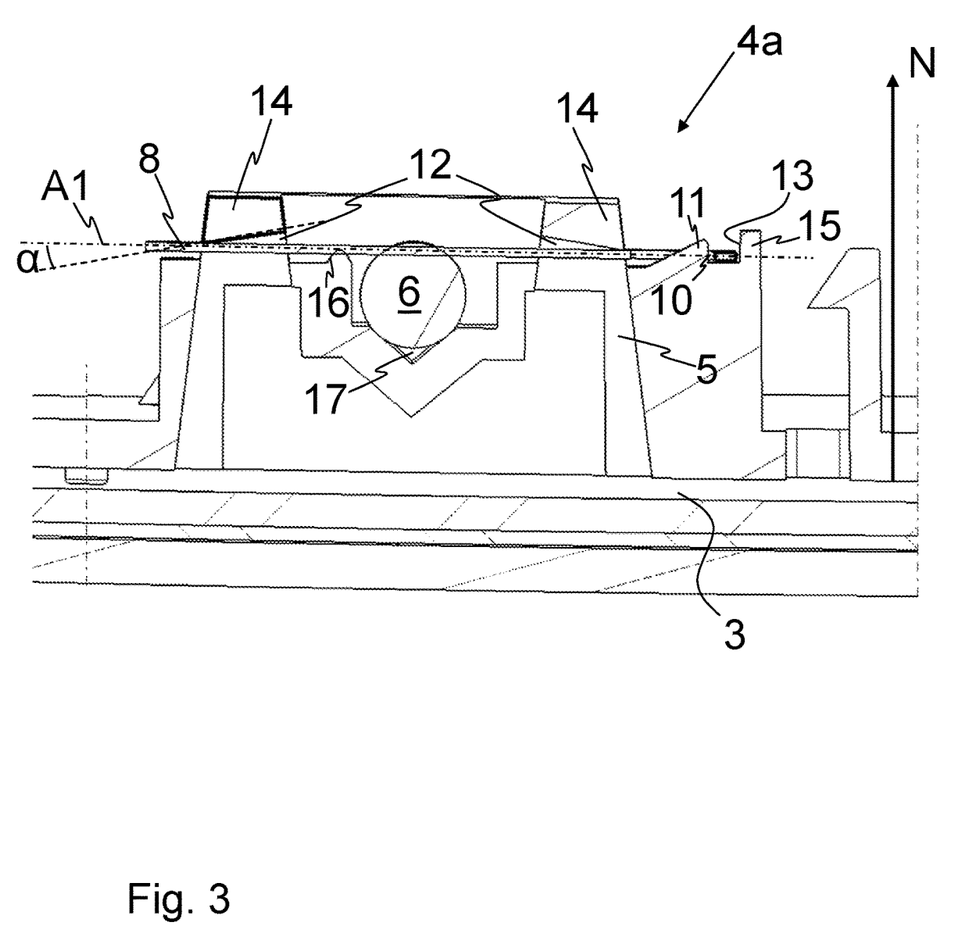
FIG. 3 is a sectional view of an implementation of a fixation arrangement.

FIG. 3 shows a sectional view of the first fixation element 4a along the line L1 shown in FIG. 1. Two side walls 14 of the cradle 5 extend from the base plate 3 to form the receiving portion for receiving the locking pin 6. In order to properly align the locking pin 6 in the cradle 5, the bottom of the cradle 5 may include a seat 17, such as a groove extending in the desired direction of the locking pin 6, in which the rod shaped pin 6 can settle.

The side walls 14 each include one of said slots 12 for receiving the spring 8. The slots 12 are arranged opposite of each other and have a common geometrical axis A1 which extends through a center of each slot 12. The slots 12, and thus also the spring 8 when it is mounted in the slots 12 in an unloaded state, are arranged at a height of the side walls 14 from the base plate 3 which is lower than the distance from the base plate 3 to the top of the locking pin 6 when resting in the cradle 5, such that the locking pin 6 covers a direct path between the slots 12 when the pin 6 is inserted into the cradle 5. Thereby, the spring 8 is forced to arch when the locking pin 6 is located between the cradle and the spring 6, which tensions the spring. The tension in the spring 8 creates a force which presses the rod shaped pin 6 towards the seat 17 of the cradle 5, thereby fixating the housing 2 including the camera to the bracket 3. In order to enable the arching of the spring 8, a surface of the slots 12 located the farthest away from the seat 17 of the cradle 5 may be arranged at an angle α to the common geometrical axis A1, thereby allowing the spring to arch within the slot 12 when the locking pin 6 is inserted between the spring 8 and the bottom of the cradle 5. The surface of the slots 12 located the farthest away from the seat 17 of the cradle 5 thus has an inclination such that the slots are wider towards the receiving portion of the cradle 5 than towards an outside of the cradle 5. The angle α of the inclination of the surface of the slots 12 located the farthest away from the seat 17 of the cradle 5 is further configured such that the resilient length of the spring 8 is maximized, when the spring 8 is in its loaded state, such as when the locking pin 6 is inserted between the spring 8 and the bottom of the cradle 5.

The first fixation element 4a further includes a first protrusion 11 extending from the cradle 5. The protrusion 11 is arranged to engage the through-hole 10 when the spring 8 is inserted into the slot 12 of the cradle 5. The protrusion 11 may be arranged on the outside of one of the side walls 14 and on the same geometrical axis A1 as the slots 12, such that the protrusion 11 may engage the through-hole 10 of the spring 8 when the spring 8 has been inserted into the slot 12 along the geometrical axis A1 and extends through both of the side walls 14. Moreover, as illustrated in FIG. 3, the first fixation element 4a has a normal extension N extending in a direction normal to the base plate 3.

The first protrusion 11 may be angled in an insertion direction of the spring 8, which may also be referred to as the first protrusion having a wedge-shaped form being tapered towards the opening of the slot 12. As such, and as illustrated in FIG. 3, the first protrusion 11 may be such that the distance, in the normal direction N, from the surface of the first protrusion 11 to the base plate 3 increases in a direction away from the adjacent side wall 14.

A distal end of the first protrusion 11, from the opening of the slot 12, may be substantially perpendicular to the geometrical axis A1 of the slot 12. An apex of the first protrusion 11 is located further from the base plate 3 than the opening of the slot 12 facing the first protrusion 11. Thereby, when the spring 8 is inserted into the slot 12, it will slide over the wedge-shaped first protrusion 11 causing the spring 8 to bend, which will cause the spring 8 to be loaded.

When the through-hole 10 of the spring 8 reaches the apex of the wedge-shaped first protrusion 11, the load on the spring will cause the spring 8 to return to its unloaded state such that the first protrusion extends through the through-hole 10. The extension of the first protrusion 11 through the through-hole 10 of the spring 8 prevents the spring from being retracted through the slot 12 and thus secures the spring 8 to the cradle 5.

In order to prevent a movement of the spring 8 in the insertion direction of the spring 8 the cradle may include a second protrusion 15 arranged at a distance from the first protrusion 11, such that a groove 13 is created between the first and the second protrusions 11, 15 for accepting the spring 8. The distance between the first protrusion 11 and the second protrusion 15 is selected such that the distance is larger than a thickness, in the direction of the axis A1, of the material of the spring 8 surrounding the through-hole 10 of the spring 8. Thereby the spring is trapped in the groove 13 between the first protrusion 11 and the second protrusion 15, such that a movement of the spring 8 in any of the directions along the axis A1 is restricted.

The cradle 5 may further include a third protrusion 16, wherein the third protrusion 16 is arranged to contact the spring 8 when the spring is inserted into the slot 12 of the cradle 5, such that the third protrusion 16 preloads the spring in the absence of the locking pin 6 of the housing 2. The bracket 1 may be preassembled at a first location and may then be transferred to a second location where the housing 2 including the camera is fitted to the bracket 1. In order to prevent the spring 8 from being dislocated from, for instance by rattling or falling off, the bracket, a pre-tensioning force may be applied to the spring by means of the third protrusion 16. An apex of the third protrusion 16 is also located further from the base plate 3 than the lower part of the opening of the slot 12. Thereby, when the spring 8 is inserted into the slot 12, it will slide over the third protrusion 16 causing the spring 8 to bend, which will cause the spring 8 to be pre-loaded. When the housing 2 including the camera is fitted to the bracket 1, such as e.g. by inserting the locking pin 6 into the cradle 5, the spring 8 is forced away from the third protrusion 16 such that the spring 8 is no longer in contact with the third protrusion 16. Thus, the spring 8 may have at least three contact points, such as the slots 12 in each of the side walls 14 and the third support element 16 or the locking pin 6, such that the spring 8 after being mounted in the cradle 5 is always under a certain degree of pretension.

Figure 4:
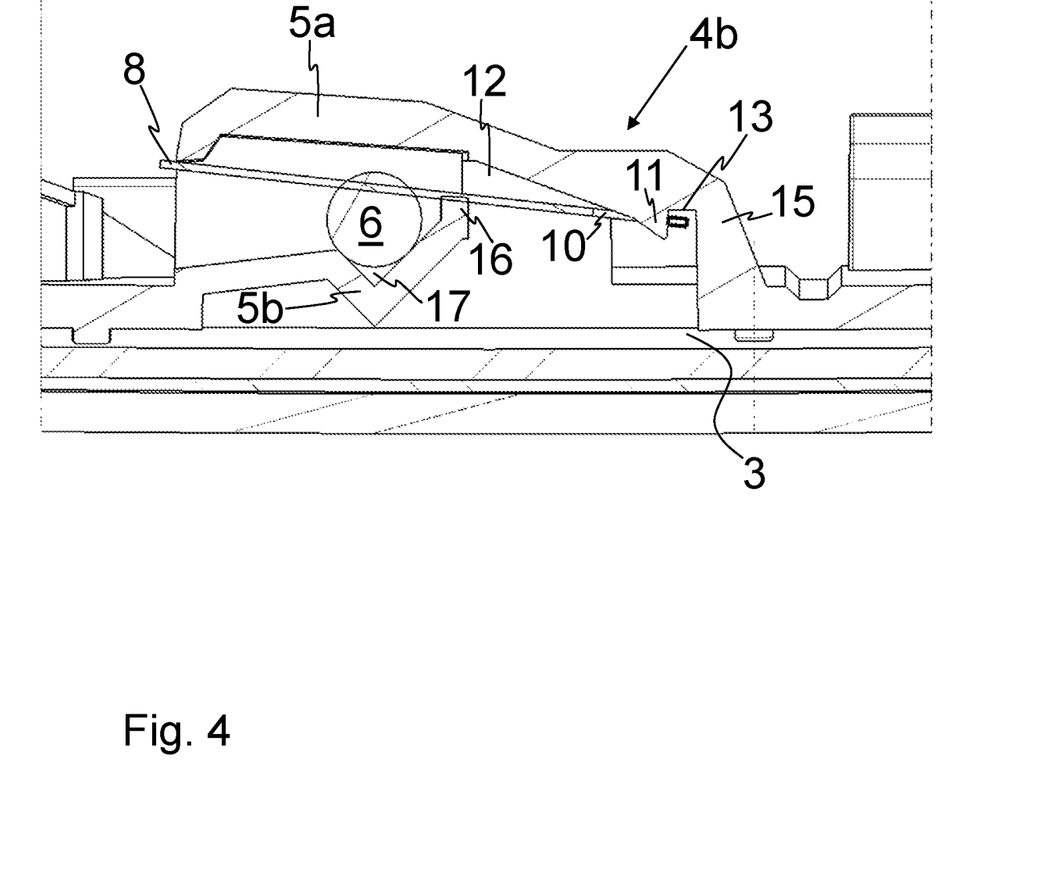
FIG. 4 is a sectional view of another implementation of a fixation arrangement.

FIG. 4 illustrates a fixation element according to a second embodiment herein, such as e.g. the second and third fixation elements 4b shown in FIG. 1. The working principle of the fixation element according to this embodiment is similar to the working principle of the fixation arrangement according to the embodiment shown in FIGS. 2 and 3. However, instead of the cradle 5 having a plurality of side walls, as in FIGS. 2 and 3, the cradle 5 according to FIG. 4 is open to the sides and includes an upper cradle element 5a and a lower cradle element 5b, being arranged to form a claw-like receiving portion for receiving the locking pin 6 of the housing 2. An opening is provided in one end of the cradle 5, for allowing the locking pin 6 to be inserted into the cradle 5. The opening may be e.g. U-shaped or V-shaped. The fixation element 4 includes the first protrusion 11 extending from the upper cradle element 5a. The protrusion 11 is arranged to engage the through-hole 10 of the spring 8, when the spring 8 is inserted into the slot 12 provided between the upper cradle element 5a and the lower cradle element 5b. The upper cradle element 5a further includes the second protrusion 15 arranged at a distance from the first protrusion 11, such that the groove 13 is created between the first and the second protrusions 11, 15 in the upper cradle element 5a, for accepting the spring 8. The lower cradle element 5b includes the seat or receiving portion for receiving the locking pin 6. In order to properly align the locking pin 6 in the cradle 5, the seat of the cradle 5 may include a groove 17, and/or a V-shape, extending in the desired direction of the locking pin 6, in which groove 17 the locking pin 6 can settle. The lower cradle element 5b further includes the third protrusion 16, wherein the third protrusion 16 is arranged to contact the spring 8 when the spring is inserted into the slot 12 of the cradle 5, such that the third protrusion 16 preloads the spring in the absence of the locking pin 6 of the housing 2. When the spring is mounted in the cradle 5 the spring 8 has three contact points, the first contact point is on the outer edge of the upper cradle element 5a, the second is against the first protrusion 11 and the third contact point is the third protrusion 16 on the lower cradle element 5b. As for the embodiment shown in FIG. 3, the distance from the base plate 3 to the spring 8 when it is mounted in the cradle 5 in the absence of the locking pin 6 is smaller than the distance from the base plate 3 to the top of the locking pin 6 when resting in the cradle 5. Thereby, the spring 8 will be loaded when the locking pin 6 is inserted between the cradle 5 and the spring 8, which will tension the spring 5. The tension of the spring 8 creates a force which presses the locking pin 6 towards the bottom of the cradle 5, thereby fixating the housing 2 including the camera to the bracket 3.

Figure 5:
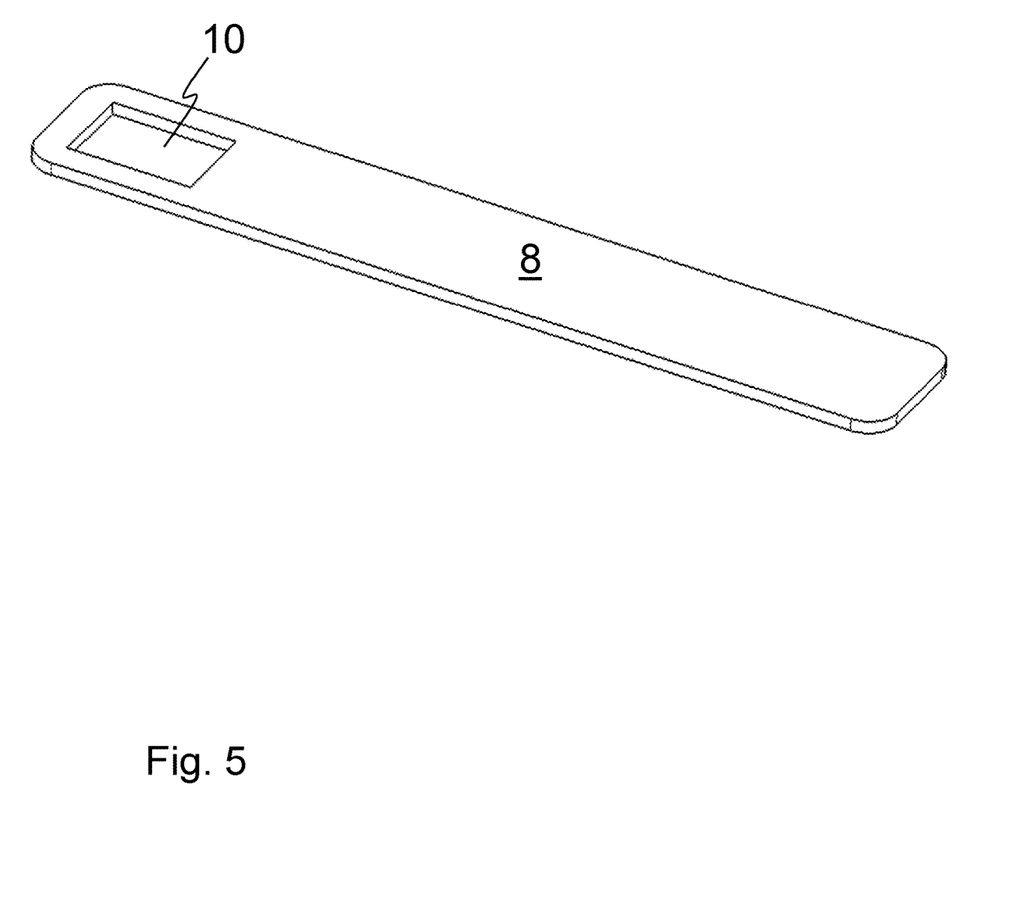
FIG. 5 is a schematic illustration of a spring.

FIG. 5 illustrates the spring 8 according to embodiments herein. The spring 8 has a shape of an elongated flat (in an unloaded state) plate and includes a through-hole 10 arranged on a longitudinally distal end of the spring 8, for securing the spring 8 to the cradle 5. Having the shape of an elongated flat plate shall herein be understood as not having any bends or protruding portions in a direction other than a main plane of the spring 8. This has the benefit that the material of the spring is not affected by any reshaping of the spring, which would require after-treatment of the material in order for the spring to regain its properties, such as e.g. heat treatment. The through-hole 10 is arranged to receive the first protrusion 11 in order to fixate the spring 8 to the cradle 5. The spring 8 may e.g. be made of metal, such as e.g. spring steel. In some embodiments the spring 8 may e.g. be a leaf spring.

The spring may be symmetric in two perpendicular planes extending through a center of the spring 8. Having an asymmetrical spring having e.g. an angled leg or a tab or the like protruding from one of the sides of the spring requires a person assembling the bracket to carefully study the mounting direction of the components in order to ensure a correct positioning of such a spring, since a wrongfully mounted spring may prevent the housing 2 including the camera to be correctly mounted on the bracket 1. Hence, by making the spring symmetric the risk of an improper mounting of the spring 8 in the cradle 5 is reduced, since the mounting of the spring 8 is not sensitive to the direction, e.g. which side is up and which side is down, of the spring 8.

Thereby, the time and effort for mounting the spring 8 on the bracket 1 can be reduced. It is also within the scope of the appended claims that the spring 8 may include an opening, such as a through-hole, at each longitudinally distal end of the spring 8 (not shown), such that the spring 8 may be inserted by either one of its ends first into the slot or slots 12. Thereby, the spring 8 may be symmetric in three perpendicular planes, which would further minimize the risk of an improper mounting of the spring 8 during assembly and further reduces the time and effort for mounting the spring 8 on the bracket 1.

Figure 6:
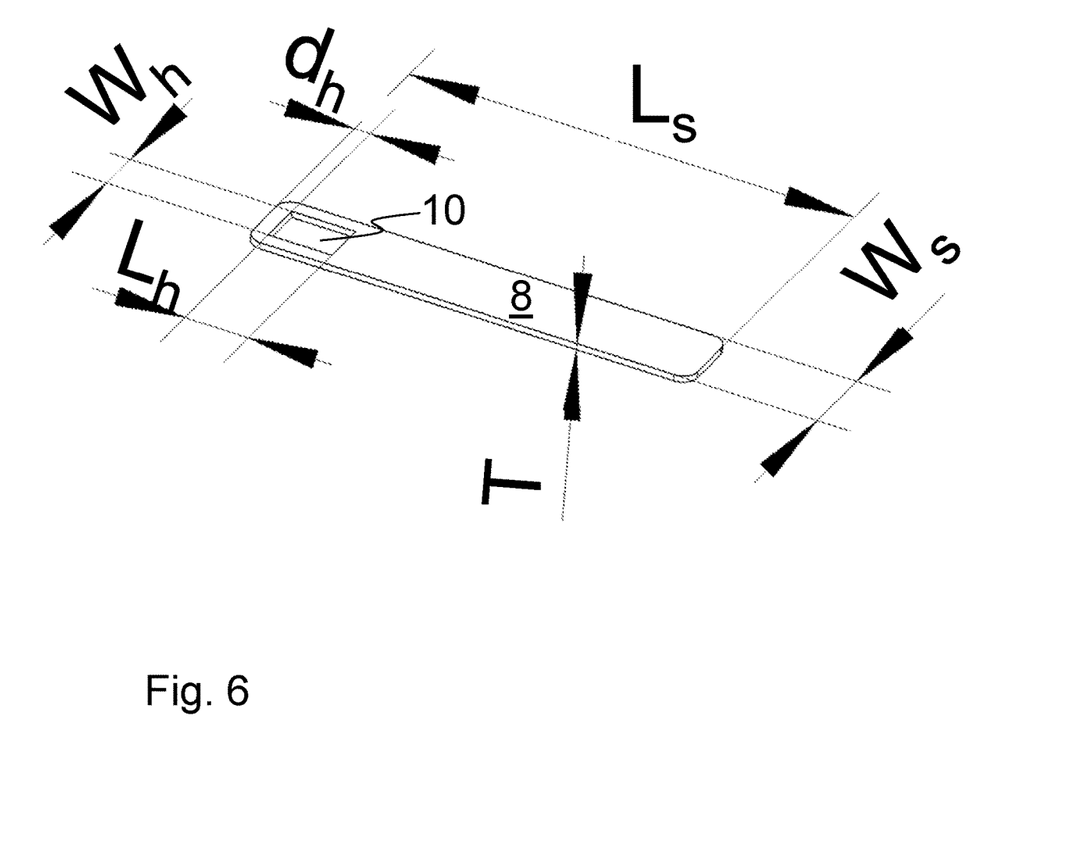
FIG. 6 is a schematic illustration showing exemplary dimensions of the spring.

FIG. 6 discloses some exemplary dimensions of the spring 8 according to the embodiments herein. According to some embodiments the spring 8 may have a length $L_s$ in the range of 25 to 30 mm, such as e.g. 28 mm. The width $W_s$ of the spring 8 may be in the range of 3 to 8 mm, such as e.g. 5 mm, and the thickness T may be in the range of 0.3 to 0.6 mm, such as e.g. 0.4 mm. The through-hole 10 may have a length $L_h$ in the range of 3 to 6 mm, such as e.g. 4 mm, a width $W_h$ in the range of 2 to 6 mm, such as e.g. 3 mm, and may be arranged at a distance from the edge of the spring 8 in the range of 1 to 3 mm, such as e.g. 1 mm.

The invention claimed is:

1. A bracket for fixating a housing comprising a camera, wherein the bracket is configured to be mounted to a windscreen of a road vehicle, the bracket comprising:
    a base plate adapted to be mounted to the windscreen, and
    a fixation arrangement for securing the housing comprising the camera to the bracket, wherein the fixation arrangement comprises a cradle, forming part of said base plate, for receiving a locking pin protruding from the housing, the fixation arrangement further comprising a spring for applying a pressure on the locking pin forcing the locking pin towards a seat of the cradle when the spring has been inserted into at least one slot of the cradle such that the locking pin is located between the spring and a seat of the cradle, wherein the spring has a shape of an elongated flat plate and that the spring comprises a through-hole for securing the spring to the base plate, wherein the through-hole is arranged at a longitudinally distal end of the spring, and wherein the fixation arrangement comprises a first protrusion connected to said base plate, wherein the protrusion is arranged to engage the through-hole when the spring is inserted into the slot of the cradle.

2. The bracket according to claim 1, wherein said first protrusion is a part of said cradle.

3. The bracket according to claim 1, wherein the spring is made of metal.

4. The bracket according to claim 1, wherein the spring is symmetric in two perpendicular planes extending through a center of the spring.

5. The bracket according to claim 1, wherein the spring comprises a through-hole at each longitudinally distal end of the spring.

6. The bracket according to claim 1, wherein the first protrusion is angled in an insertion direction of the spring allowing the spring to slide over the protrusion when the spring is inserted into the slot of the cradle such that the first protrusion engages the through-hole and prevents a movement of the spring in a direction opposite to the insertion direction.

7. The bracket according to claim 6, wherein the fixation arrangement further comprises a second protrusion arranged at a distance from the first protrusion such that a groove for accepting the spring when the spring is fully inserted into the slot is created, thereby restricting a movement of the spring in the insertion direction and/or in a direction opposite of the insertion direction.

8. The bracket according to claim 1, wherein the cradle comprises a third protrusion arranged to contact the spring when the spring is inserted into the slot of the cradle, such that the second protrusion preloads the spring even when no locking pin is located between the seat of the cradle and the spring.

9. The bracket according to claim 8, wherein the fixation arrangement comprises an opening for allowing the locking pin to be placed onto the seat of the cradle.

10. The bracket according to claim 1, wherein a surface of the slot, which surface is located the farthest away from the seat of the cradle is arranged at an angle to a common geometrical axis (A1) of the slots, such that the slots are wider towards the receiving portion of the cradle than towards an outside of the cradle.

11. The bracket according to claim 1, wherein the bracket comprises a plurality of fixation arrangements.

12. The bracket according to claim 1, wherein the bracket comprises three fixation arrangements, wherein a first fixation arrangement is arranged in front of a mounting area for mounting the housing comprising the camera when the bracket is mounted to the windscreen of the road vehicle, and wherein a second and a third fixation arrangement are arranged on respective sides of the mounting area, which sides are substantially parallel to a longitudinal axis of the road vehicle, wherein the fixation arrangements are open in the same direction.

13. An assembly comprising the bracket according to claim 1 and a housing comprising a camera, wherein the housing comprises one or more of said locking pins and wherein each locking pin of the housing is fixated in a corresponding fixation arrangement of the bracket.

* * * * *